Patented Apr. 17, 1934

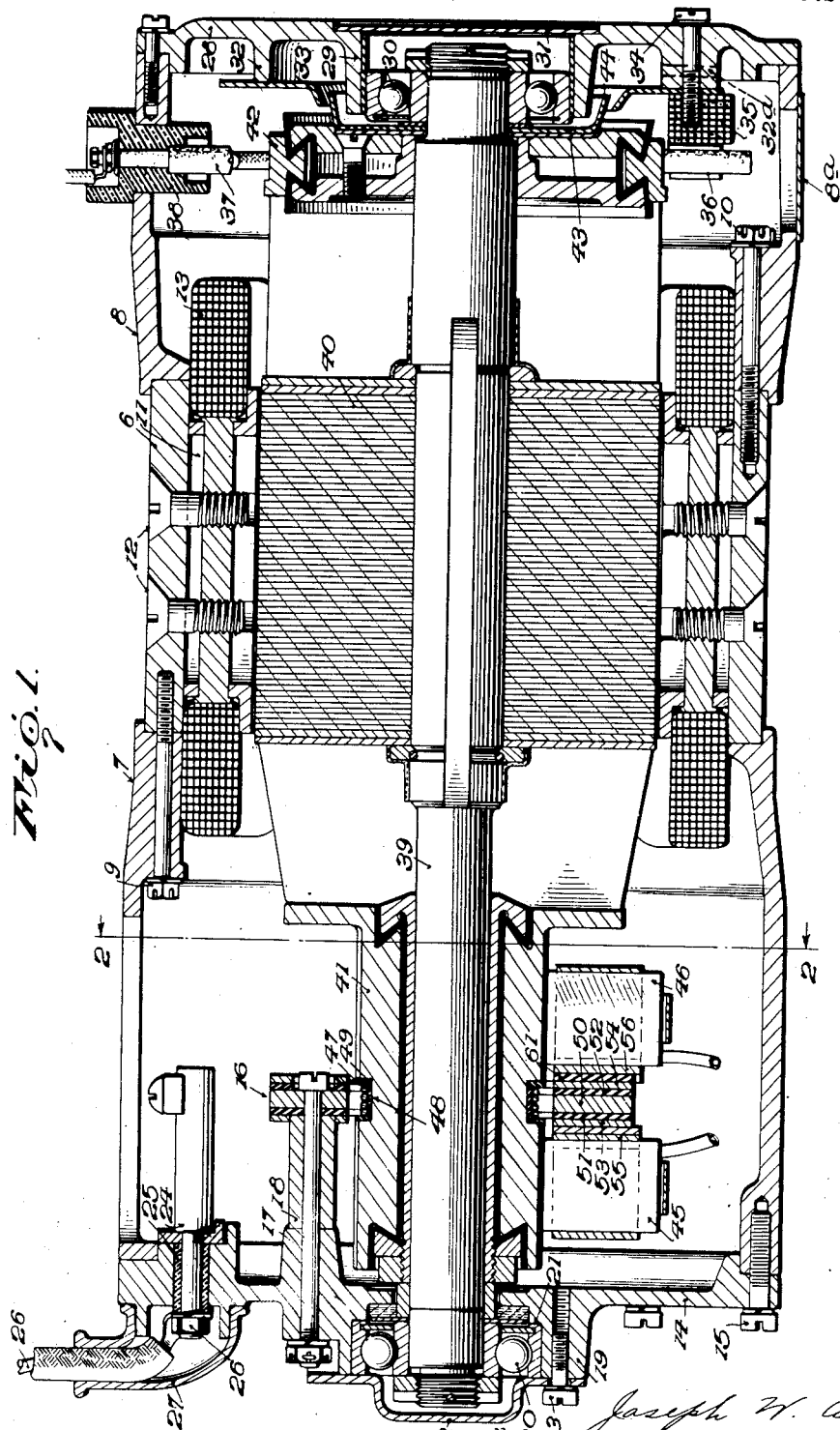

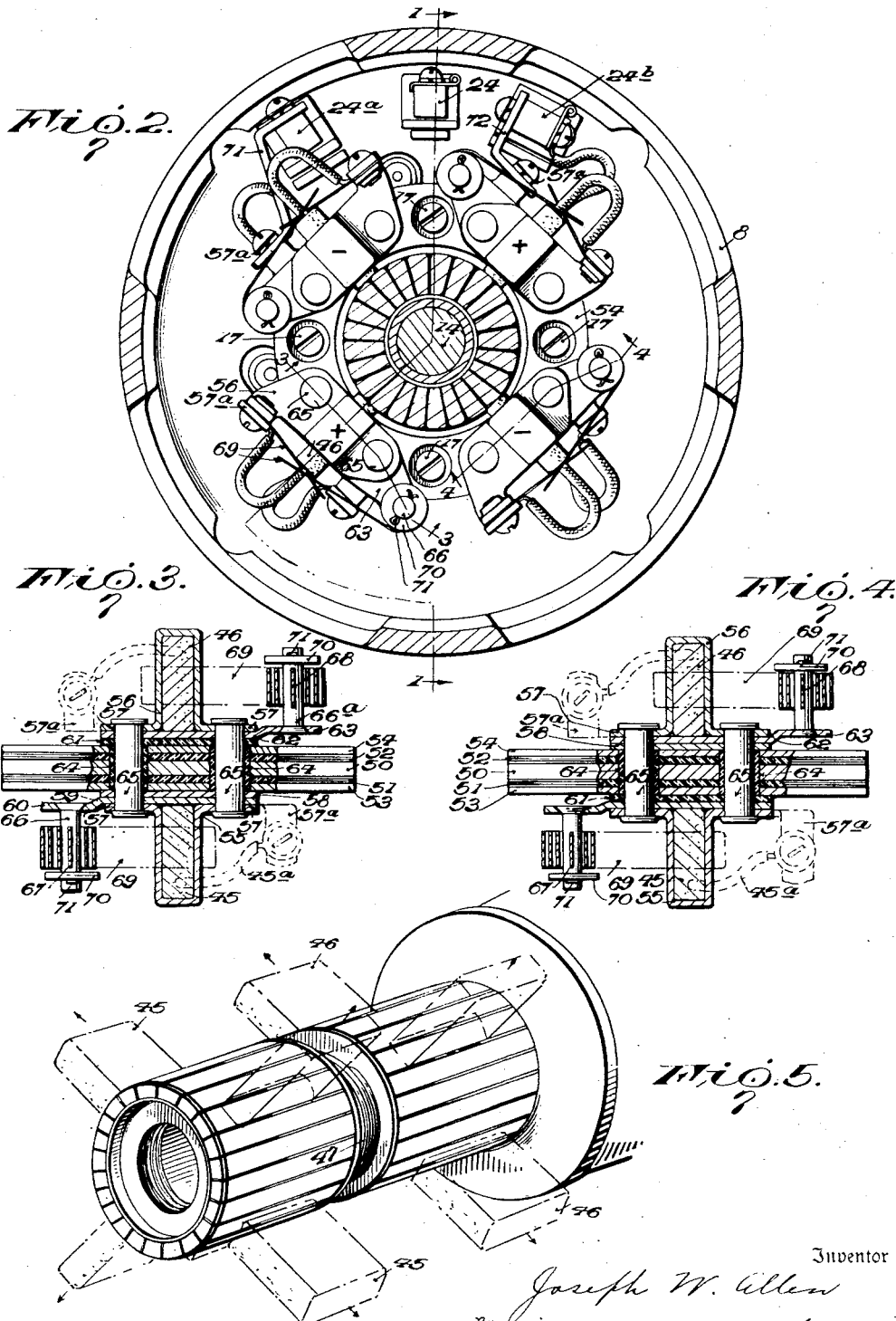

1,954,910

UNITED STATES PATENT OFFICE 1,954,910

BRUSH MOUNTING FOR ELECTRICAL MACHINES

Joseph W. Allen, East Orange, N. J., assignor to Eclipse Aviation Corporation, East Orange, N. J., a corporation of New Jersey Application December 31, 1929, Serial No. 417,777

14 Claims. (Cl. 171—324)

This invention relates to electrical apparatus and more particularly to a dynamo-electric machine.

One of the objects of this invention is to provide a machine of the above type with novel brush mounting means.

Another object of the invention is to provide a commutator brush mounting embodying novel means of simple and rugged construction for electrically connecting the brushes to each other and to a source of current.

A further object is to provide a novel brush mounting which is so constructed and mounted that the entire brush assembly may be removed as a unit from the machine for adjustment and repair. These and other objects will appear more fully hereinafter in the detailed description of the invention.

One embodiment of the present invention is illustrated in the accompanying drawings wherein like reference characters refer to like parts throughout the several views. It is to be expressly understood, however, that the drawings are for the purpose of illustration only and are not designed as a definition of the limits of the invention, reference being had for this purpose to the appended claims. In the drawings, Fig. 1 is a longitudinal view in section of a dynamo-electric machine embodying the present invention, the section being taken on line 1—1 of Fig. 2;

Fig. 2 is a transverse section on line 2—2 of Fig. 1 showing the relative position the brush boxes may occupy on the mounting means;

Fig. 3 is a longitudinal section on line 3—3 of Fig. 2 showing in detail the structure and position of parts constituting the mounting for the positive current brushes and the electrical connection with the positive current conducting ring;

Fig. 4 is a longitudinal section on line 4—4 of Fig. 2 similar to Fig. 3, showing a pair of negative current carrying brushes and the electrical connection with the negative current carrying ring; and Fig. 5 is a perspective view illustrating the relative position of the brushes on the commutator.

In the form shown, the electric machine embodying the present invention is of the dynamotor type. In machines of this character the rotor is provided with two armature windings connected respectively with commutators mounted at each end of the body portion of the rotor. A stationary field winding is mounted in inductive relation to the two armature windings. One of the armature windings and the field winding are adapted to be energized from a source of direct current to produce a motor effect and cause a rotation of the rotor. The rotation of the second armature winding through the field induces a voltage the current resulting therefrom being collected from its connected commutator which has electrical characteristics dependent on the particular design of the windings employed.

As illustrated, the dynamotor comprises a hollow cylindrical casing composed of an intermediate portion 6 having extensions 7 and 8 attached to the opposite ends respectively by bolts 9 and 10. Mounted on the inside of the intermediate portion 6 are a plurality of pole pieces 11 suitably attached thereto as by means of screws 12 and formed to clamp the generating field coils 13 to the inner surface of the casing. A head 14 is removably secured to the front end of the casing extension 7 by screws 15. Retaining means for a brush mounting 16 comprising bolts 17 and spacers 18 are carried by the head, in spaced relation only one of each of the same being illustrated. The head 14 is also provided with a bearing boss 19, and an anti-friction bearing 20 is seated therein with its outer race clamped between a shoulder 21 on said boss and a cover member 22 suitably fixed thereto as by means of cap screws 23. Three suitable low tension terminal members, one of which is shown at 24, are mounted in the end of the front head 14, being insulated therefrom, as indicated at 25. The outer ends of the low tension terminals constitute binding posts for the low tension leads, one of which is shown at 26, said leads being enclosed by a suitable metallic cap 27 attached to head 14.

A back head member 28 is removably mounted on the back end of the casing extension 8 and is provided with a bearing boss 29 adapted to receive an anti-friction bearing 30. A cover 31 is provided for the opening in the head through which the bearing is inserted. The inner side of this head member 28 is provided with a circular boss 32 on which is mounted a flanged plate 33 having a circular aperture in the center, the edges of which are belled inwardly. This plate is held in position by screws 34 extending from the outside of the head through the plate and into insulating blocks, one of which is shown at 35, the screws drawing the blocks against the plate. This plate, together with the boss forms an annular recess or sump for collecting oil thrown from bearing 30. An aperture 32ª must be provided in the lower part of the circular boss 32 to allow the waste oil to drain from the sump onto a plate 8ª removably attached to the casing extension 8. The blocks also constitute brush holders for carrying a plurality of brushes, one of which is shown at 36. Lead wires extending from the brushes are connected with terminals, one of which is shown at 37, mounted in the casing extension 8 and suitably insulated by a bushing 38.

An armature shaft 39 is rotatably mounted within the bearings 20 and 30 and carries a core 40 provided with a low voltage motor armature winding, the coils of which are connected to the bars of a commutator 41 mounted on the front end of the shaft. The armature core also carries a high voltage generating winding, the coils of which are connected to the bars of a commutator 42, mounted on the rear end of shaft 39 and adapted to cooperate with brushes 36. Mounted on the armature shaft adjacent the back head member 28 is a plate 43 having its outer edge 44 bent outwardly and extending into the belled portion of plate 33, and which is adapted, when rotated, to throw any grease or oil which may leak from the bearing into the sump. This prevents any oil or greases from reaching the commutator.

The bars of commutator 41 are made comparatively long to give the proper contact surface for the pairs of brushes 45 and 46 necessary to carry the current from the low voltage, high amperage source. To prevent buckling of these bars, a binding wire 47 is wound about the center of the bars in a recess 48 provided for that purpose. Insulating material 49 is provided to prevent short circuiting of the bars by the binding wire.

The novel brush mounting 16 comprises, in a unitary structure, an annular supporting ring 50 of suitable material such as steel, with insulating rings 51 and 52 on either side thereof between the supporting ring and annular conducting rings 53 and 54. The inside diameter of these annular rings is such that they may be longitudinally inserted around the commutator 41. On the opposite sides of these conductor rings are placed the brush boxes 55 and 56 which carry the brushes 45 and 46 respectively, having lead wires formed integrally therewith.

These brushes and brush boxes are electrically connected to one of the conductor rings 53 and insulated from the other as will be more clearly understood from a description of the detailed parts as shown in Fig. 3. The brushes are electrically connected with the conductor ring 53 carrying the initial or positive current from a suitable source of supply. As shown the brush boxes are of U shape having flanges 57 extending at right angles from the legs of the U for the purpose of attachment. An extension of one of these flanges 57 of each brush box is bent back and tapped to form a terminal member 57ª for connection with the lead wires 45ª of the brushes to insure proper contact. Between the conductor ring 53 and the brush box 55 are placed a conductive spacer segment 58 and a spring supporting member 59 with an offset part 60 extending to the left, as viewed in Fig. 3. On the opposite side between the conductor ring 54 and the brush box 56 are placed an insulating spacer segment 61 and a spring supporting member 62 with an offset part 63 extending to the right. The supporting ring 50, insulating rings 51, 52 and conductor rings 53, 54 are provided with a plurality of aligned apertures to receive insulating sleeves 64 extending through these parts. The spacer segments 58, 61, spring supporting members 59, 62, and the flanges 57 of the brush boxes are also apertured in the same alignment but of a less diameter equal to that of the inside of the sleeve members only. Studs 65 of a conducting material such as copper, are passed through the aligned apertures and the insulating sleeves, and the ends are beaded over to hold the parts assembled and the brush boxes in electrical connection with the positive current ring. The two brush boxes are connected together and to the positive current ring 53 by the conductive rivets 65 and spacer segment 58 but insulated from the other conductor ring 54 by the insulating spacer segment 61 and sleeves 64.

Positioned on the extensions 60 and 63 of the spring supporting members are studs 66 and 66ª which have attached thereto helical springs 67 and 68. These springs have flat end portions 69 extending outwardly from the coil and resting upon the top of the brushes 45 and 46 respectively, for maintaining the brushes in contact with the commutator with the proper bearing pressure. Washers 70 are provided on the studs to prevent the displacement of the spring coils and said washers may be held on the studs by cotter pins 71.

Fig. 4 shows an alternate pair of brush boxes that are electrically connected with the conductor ring 54 which carries the return or negative current. This figure is similar to Fig. 3 and differs only in that the position of the insulating and conductor spacer is reversed. The insulating spacer segment 61 is positioned between the positive conductor ring 53 and the brush box 55, while the conducting spacer 58 is positioned between the negative conductor ring 54 and the brush box 56. The two brush boxes are thereby electrically connected together and to the negative current ring 54 by the conductive rivets 65 and spacer segment 58 but insulated from the positive current ring by the insulating spacer segment 61 and sleeves 64.

As shown in Figs. 2 and 5 there are preferably four pairs of brushes mounted in radial spaced relation carrying alternately positive and negative current which correspond with the four poles of the machine. The three terminal members 24, 24ª and 24ᵇ are shown with members 24ª and 24ᵇ electrically connected to the conductor rings 54 and 53 by means of jumpers 71 and 72 attached at one end to the terminals 24ª and 24ᵇ and at the other end to terminals 57ª of a positive and negative current brush box respectively. Terminal 24 is provided for use, if it is desired, to connect one end of the field winding to a voltage regulator remote from the machine. The connection of the field winding with a source of current is not shown but is in practice preferably connected in shunt with the motor winding from the terminals 24ª and 24ᵇ. The heads of the retaining bolts 17 are shown which together with the spacers 18 of Fig. 1 hold the mounting and brushes in their proper position and allow the removal of the head 14, entire brush assembly 16, and terminal connections 24, 24ª and 24ᵇ as a unit.

The operation of the device is as follows: Low voltage current supplied to the terminal 24ᵇ is fed through the jumper 72, positive brush box terminal 57ª, and positive conducting ring 53 to supply all of the positive pairs of brushes with current. This current through the commutator 41 and a shunt field connection energizes the motor armature winding and the field winding whereby the armature shaft is rotated. The current is lead back to the source of supply through the commutator 41 and the alternate negative current brushes which are connected to the negative current ring 54, and then to the brush box terminal 57ª, jumper 71, terminal 24ª and a line wire connected therewith. As the generator armature winding rotates between the field poles, voltage is induced and delivered to the commutator 42 mounted on the rear end of the shaft. The current is collected by brushes 36 carried on the back head member 28 and delivered to the terminal members 37. Lead wires (not shown) are connected with the terminal members to supply a load.

There is thus provided a novel dynamo-electric machine embodying improved oil throwing means and a simplified and improved brush mounting means, the latter being so constituted as to practically eliminate the necessity for connecting wires. The mounting is rugged and simple in construction and can be readily removed or installed as a unit. It will be understood that, although but one embodiment of the present invention has been shown and described, various changes may be made therein, such as changing the machine from a four pole machine to a bi-polar or multi-polar machine having any number of poles and the corresponding number of brushes as required. Further, the particular brush mounting is adapted for any dynamo-electric machine and is not limited to use on a dynamotor. Also it will be readily apparent to those skilled in the art that various changes may be made in the details of construction and arrangement of parts without departing from the invention defined in the following claims.

What is claimed is:

1. A brush mounting of the class described, comprising an annular supporting ring, an annular conducting ring insulated therefrom, and a plurality of brush boxes radially spaced in tandem groups on the conducting ring, and means extending through both said rings for holding the parts in assembled relation.

2. A brush mounting for dynamo-electric machines of the commutator type, comprising an annular supporting ring, an annular conducting ring, an insulating ring between the supporting and conducting rings all of said rings being disposed in concentric relation to the axis of said commutator, a plurality of brush boxes radially spaced in tandem groups on the conducting ring, and conducting members for holding the parts assembled.

3. A brush mounting for dynamo-electric machines, comprising an annular supporting ring having a lateral face, an annular conductor ring having lateral faces on either side, an insulating ring between the inside lateral face of the conductor ring and the lateral face of the supporting ring, a plurality of U-shaped brush boxes with flanges radially spaced on the conducting rings, and means extending through the flanges, conducting ring, insulating ring and supporting ring for holding the parts assembled.

4. A brush mounting for dynamo-electric machines comprising a supporting ring, conducting rings on each side thereof, but insulated therefrom, a plurality of brush boxes spaced apart radially on one of the conducting rings, and conductive studs for holding the brush boxes in position said conductive studs extending through all of said rings, the alternate brush boxes being electrically connected respectively to one or the other of the two conductive rings by the conductive studs.

5. A brush mounting for dynamo-electric machines comprising an annular supporting ring, conducting rings on each side thereof, insulating rings between the conducting and supporting rings, a pair of brush boxes positioned on opposite sides of the conducting rings, one in contact with one ring, and the other insulated from the other ring, and conducting members extending through the entire structure for electrically connecting the pair of brush boxes to one conducting ring and retaining the entire structure in assembled relation.

6. A brush mounting for dynamo-electric machines comprising a supporting ring, a conducting ring on each side and insulated therefrom, and a plurality of pairs of brush boxes of conducting material spaced apart radially, the brush boxes of each pair being positioned on opposite sides of the conductor rings, with alternate pairs in electrical connection respectively with one or the other of the two conducting rings.

7. A brush mounting for dynamo-electric machines comprising an annular supporting ring, conducting rings on each side thereof, insulating rings between the conducting and supporting rings, a plurality of pairs of brush boxes of conducting materials spaced apart radially, the brush boxes of each pair being positioned on opposite sides of the conducting rings, a conducting spacing segment between one brush box and a conducting ring on one side, and an insulator segment between the other brush box and the conducting ring on the other side, the sides on which the spacer and insulator segment are positioned being reversed on alternate pairs, and conducting rivets for each pair extending through the entire structure electrically connecting each pair of brush boxes to one or the other of the conducting rings in alternate relation and also holding the entire structure assembled.

8. A brush mounting for dynamo-electric machines, comprising a supporting ring, conductor rings on each side thereof but insulated therefrom, a pair of brush boxes positioned on opposite sides of the conductor rings, brushes in the brush boxes, a conducting spacer and a spring supporting member between the brush box and conductor ring on one side, an insulating spacer and a spring supporting member between the brush box and conducting ring on the other side, and springs connected with the two spring supporting members at one end and in contact with the brushes at the other end, to hold the brushes in their proper position in the brush box.

9. A brush mounting for dynamo-electric machines, comprising an end plate for the machine, a brush assembly consisting of a supporting ring, a pair of conducting rings and a plurality of brush boxes disposed in tandem groups in a unitary structure, and spacing means for holding the brush assembly in its proper spaced relation on the end plate, whereby the entire brush assembly may be removed as a unit with the end plate, said supporting conducting rings being disposed between individual brush boxes of said tandem groups.

10. In a dynamo-electric machine of the type embodying a casing and a commutator, brushes for said commutator, and means for mounting said brushes in operative relation with the commutator including a member removably connected to said casing, a supporting ring carried by said member, a conducting ring, means for insulating the conducting ring from the supporting ring, brush boxes mounted on opposite sides of said rings, conducting members extending through said rings and boxes, and means for securing said supporting ring to said removable member.

11. In a brush mounting for an electrical machine having a removable end plate, a brush assembly including a plurality of brushes disposed in tandem groups and a supporting ring therefor between individual brushes of said tandem groups, conducting means and insulating means for the brushes carried by said ring, supporting members extending through said ring and end plates, and spacing means carried by the supporting members intermediate the end plate and ring.

12. A unitary brush mounting for a dynamoelectric machine including a supporting ring, disc-like insulating and conducting means positioned on the opposite sides of said ring conducting means extending through all said elements for holding them in assembled relation, brush boxes secured in tandem groups to said conducting means, and brushes carried by said boxes.

13. A brush mounting comprising a supporting ring, a conducting ring insulated therefrom, brush boxes mounted in tandem groups on opposite sides of said conducting rings, and common means for securing the parts in assembled relation and for electrically connecting said brush boxes and conducting ring, said means comprising metallic studs extending through said rings and brush boxes.

14. A unitary brush mounting for a dynamoelectric machine including a supporting ring, disc-like insulating and conducting means positioned on opposite sides of said ring, brush boxes having flanges formed thereon, said flanges being positioned adjacent said conducting means and in parallelism therewith, and means for securing said flanges to said supporting ring.

JOSEPH W. ALLEN.